INVENTORS
HOWARD J. HILL, JR.
ROBERT V. BLAKELY
BY
ATTORNEYS

INVENTORS
HOWARD J. HILL, JR.
ROBERT V. BLAKELY

INVENTORS
HOWARD J. HILL, JR.
ROBERT V. BLAKELY
BY
Cumpston & Shaw
ATTORNEYS

United States Patent Office 3,304,354
Patented Feb. 14, 1967

3,304,354
METHOD AND APPARATUS FOR MOLDING
Howard J. Hill, Jr., East Aurora, and Robert V. Blakely, Lakeview, N.Y., assignors to Fisher-Price Toy, Inc., East Aurora, N.Y., a corporation of New York
Filed Apr. 8, 1963, Ser. No. 271,324
31 Claims. (Cl. 264—98)

This invention relates to an article formed from a plastic material and that has a hollow body cavity, and specifically to a new method and apparatus for making such an article. More particularly, this invention relates to a hollow plastic article, such as, for example, an article that might be employed as a part of a toy, and to a method and apparatus for the production of such an article by new and improved blow molding techniques.

A wide variety of hollow plastic objects have been produced in recent years by the use of blow molding. This is a processing technique that employs internal air pressure to form hollow plastic objects in a mold, from a parison that is initially placed in the mold. A parison is a section of an extruded tube of plastic material in its plastic state. The polyethylene squeeze bottle is probably the best known product produced by blow molding.

There are many articles that would have enhanced attractiveness, if they could be made economically by blow molding. Such articles would include, by way of example, hollow articles formed with an internal threaded socket for threaded connection to a rod or other member that could be inserted in the socket. Articles such as this have not been produced in the plast by blow molding techniques because of the apparent impossibility of removing the article from the mold.

One object of the present invention is to provide a method of making a molded hollow plastic article that is molded with an undercut socket or thread.

A more specific object of the invention is to provide a method of making a new, attractive, and more practical molded hollow plastic article that is formed with an opening therein in which a member can be inserted, and with internal means for securing the article to the inserted member.

Another specific object of the invention is to make new and attractive hollow plastic articles that are practical and useful in the manufacture and assembly of toys.

Another object of the invention is to provide a practical method for making articles of the character described.

A further object of the invention is to provide a practical method for making a hollow plastic article that is formed with an undercut socket or threaded socket.

A further object of the invention is to provide a new, practical, and efficient method for the manufacture of hollow plastic articles that are useful in the manufacture and assembly of toys.

A related object of the invention is to provide an apparatus for carrying out the method to make articles of the character described.

Another object of the invention is to provide apparatus for manufacturing hollow articles from plastic material, and for making such articles with undercut sockets or threads, in a practical and efficient manner.

Other objects of the invention will be apparent hereinafter from the specification and from the recital of the appended claims. To these and other ends, the invention, in part, resides in certain improvements and combinations of parts, all as will hereinafter be more fully described, the novel features being pointed out in the claims at the end of this specification.

Figure 1:
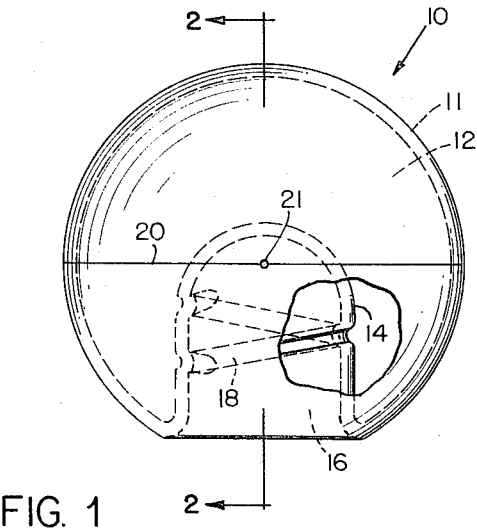
FIG. 1 is a side view of a ball-like cap that can be mounted on the end of a threaded wooden push rod for an action toy, for example, and that is constructed in accordance with one embodiment of this invention, in which view a portion of the exterior wall of the cap has been removed to reveal interior structure.
Figure 2:
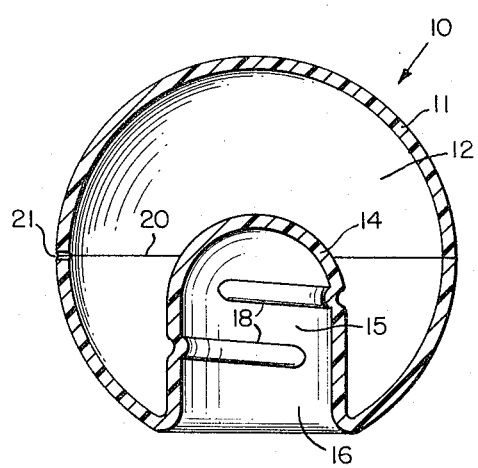
FIG. 2 is a transverse section taken on the line 2—2 of FIG. 1, looking in the direction of the arrows.

Referirng now to the preferred embodiment of the invention that is shown in FIGS. 1 and 2, by way of illustration only, and employing the numerals of reference that may be found in the drawings, the numeral 10 denotes generally a hollow, plastic ball-like cap. This cap is formed with a unitary wall 11 that encloses the internal cavity 12. The cap 10 is formed at its lower end with an integral, inwardly projecting, generally tubular extension 14, that has a bore 15 of generally circular transverse section. The extension 14 is closed at its inner end, and is open at its outer end to provide a mouth 16 that is adapted to receive the end of a rod that is to be inserted in the extension. The extension 14 is also formed, intermediate its ends, with a male thread segment 18, that projects inwardly into the bore 16.

The cap 10 is also formed with the parting line 20 that is characteristic of blow molded articles, and with an opening 21, that is located along the parting line, left by the air needle, as will be described presently.

Preferably, a blow molded cap of this type is made from a flexible, resilient, attractively colored synthetic plastic material such as, for example, a high density polyethylene, although many other materials may also be employed. The potential applications for a cap of this kind are numerous. When applied over the threaded end of a push rod for a young child's push toy, for example, the cap forms an attractive grasping knob at the end of the rod, improves the appearance of the rod, and at the same time covers any exposed sharp edges at the end of the rod and serves as a cushion that makes the toy safer to use. Moreover, the enlarged diameter of the cap, as compared to the diameter of the rod itself, reduces the unit impact of any force that is applied to or by the end of the rod and thus reduces the likelihood of any injury being caused by the rod. In addition, as compared to possible alternatives, caps made in accordance with the present invention are economical and practical, and in general permit the manufacture of articles of improved appearance and attractiveness.

In molding a cap having the construction shown in

Figure 3:
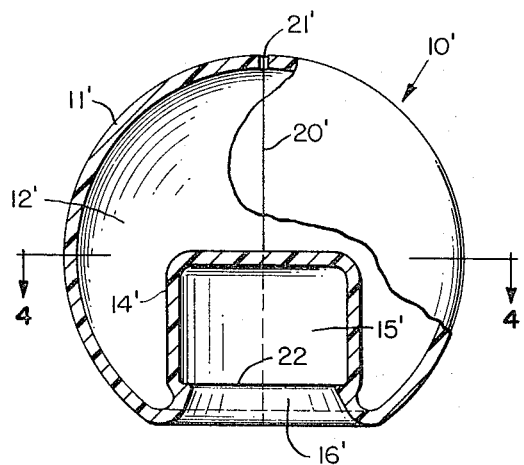
FIG. 3 is a side view of an article that is generally similar to the article of FIGS. 1 and 2, but that has been produced in accordance with another, preferred embodiment of this invention, in which view a portion of the exterior wall has been removed to reveal interior structure.
Figure 4:
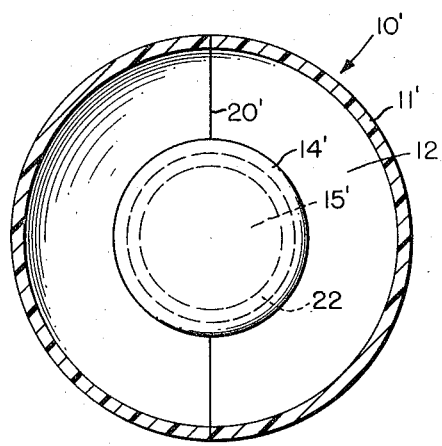
FIG. 4 is a section taken on the line 4—4 of FIG. 3, looking in the direction of the arrows.
Figure 5:
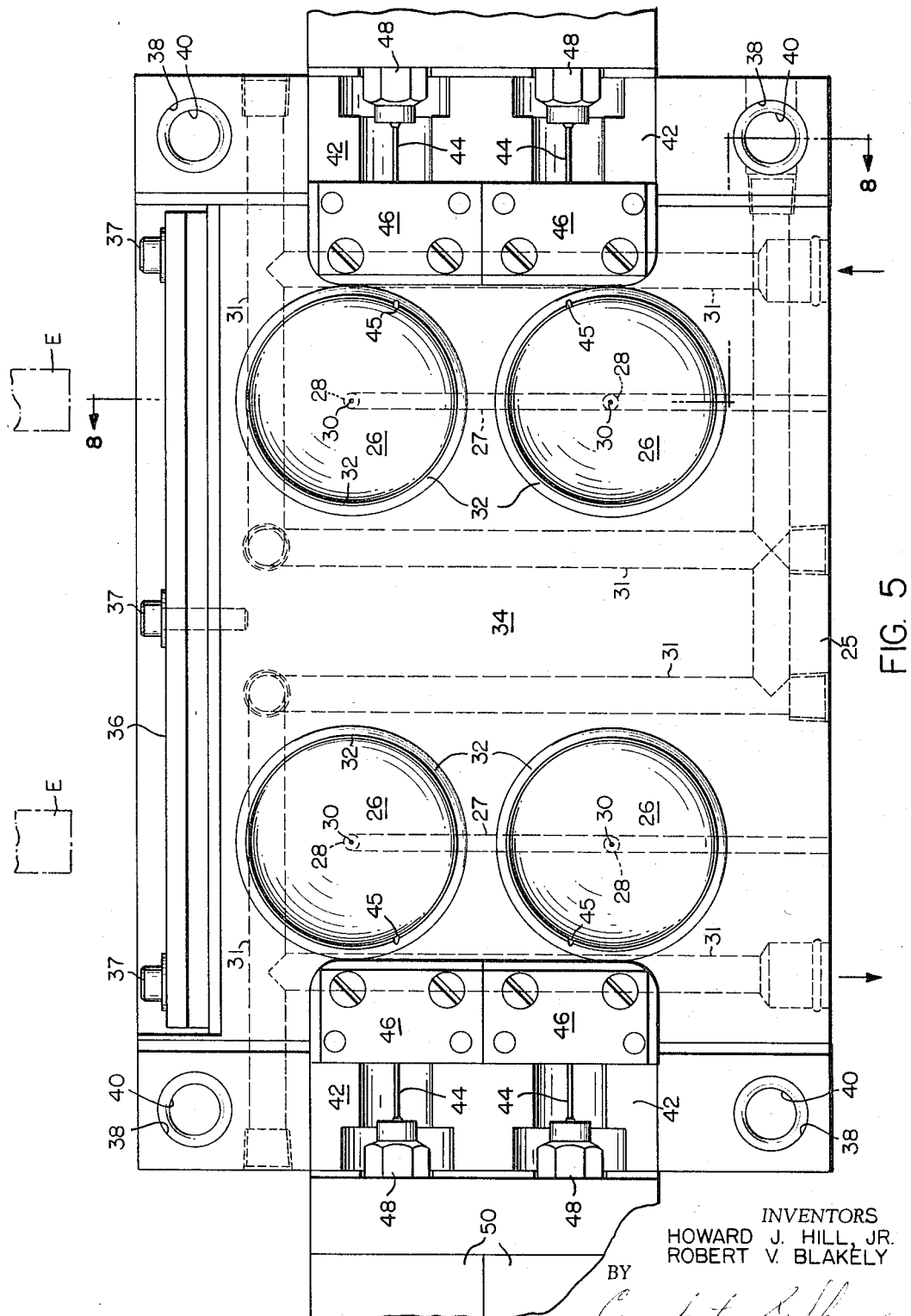
FIG. 5 is a top plan view of one-half of a mold that is constructed in accordance with the present invention, for making an article such as is illustrated in FIGS. 1 and 2 hereof.
Figure 6:
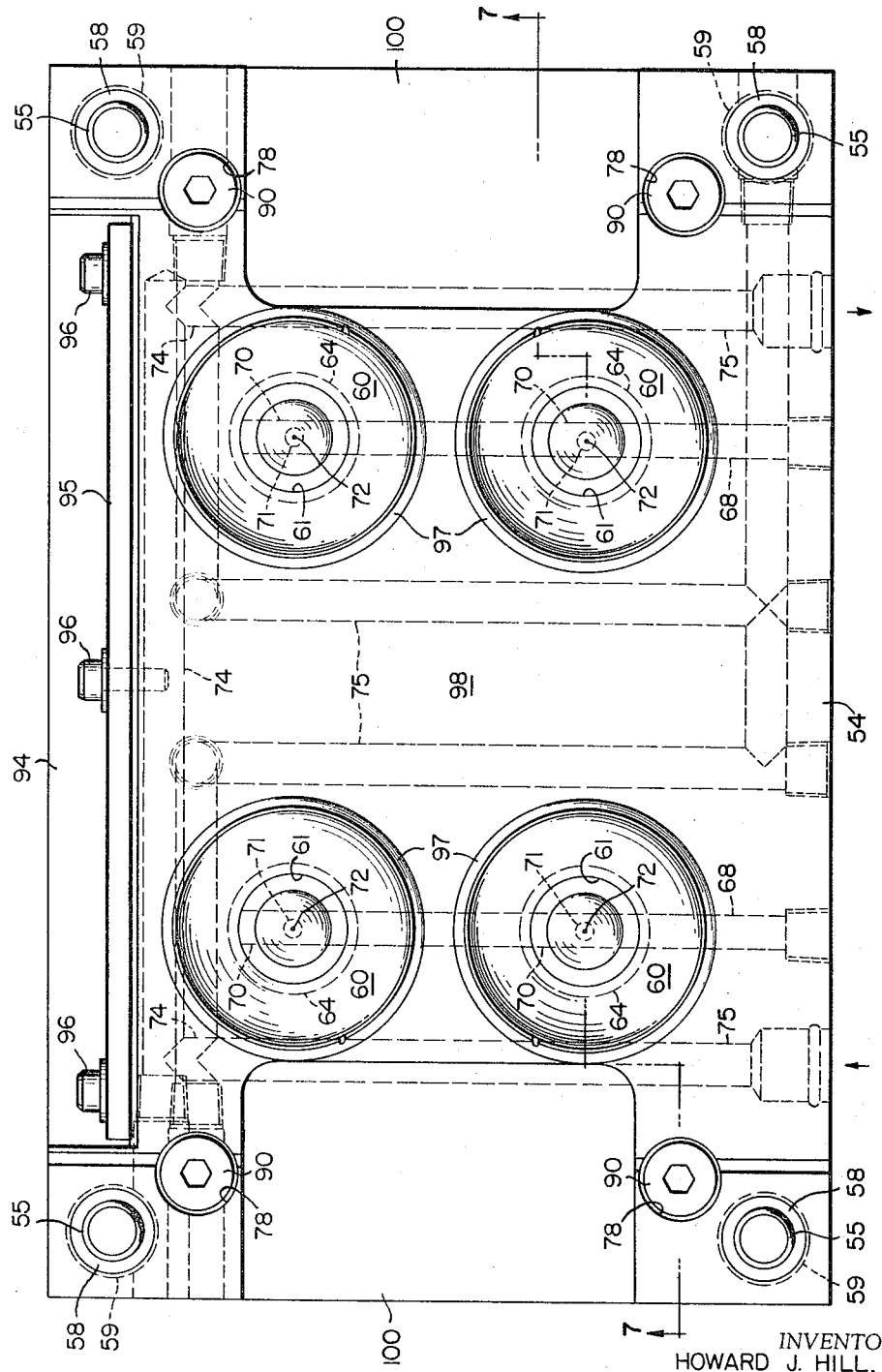
FIG. 6 is a bottom plan view of the other mating half of the mold.

FIGS. 1 and 2, the inwardly projecting tubular extension 14 is formed about a core that is disposed to extend in a direction that is generally normal to the plane of the parting line. In the modified embodiment of the invention that is illustrated in FIGS. 3 and 4, the cap has parts that are generally similar to those of the cap illustrated in FIGS. 1 and 2, and in the drawings, the parts of the cap shown in FIGS. 3 and 4, that are like the parts in the cap shown in FIGS. 1 and 2, are identified by like but primed numerals. The principal differences in construction, in the two different caps, are that the inwardly projecting, generally tubular extension 14' is formed with an inwardly projecting ridge 22, rather than with threads, and the cap itself is formed in a mold in which the core member, on which the projection 14' is formed, is disposed to extend with its lengthwise axis lying substantially in the plane of the parting line 20'.

This cap can be employed in substantially the same manner as the cap illustrated in FIGS. 1 and 2. However, instead of being intended for use with a wooden rod that has a female thread on its end, this cap is intended for use with a rod that has a circular channel adjacent its end in which the projecting ridge 22 can engage. The resilient nature of the plastic material, from which the cap is formed, permits the cap to be forced over the end of the rod, and at the same time, after the cap has once been engaged over the end of the rod, resists removal of the cap from the rod end.

One type of mold, that is constructed in accordance with one embodiment of this invention, for making caps of the kind illustrated in FIGS. 1 and 2 of the drawings, is shown in FIGS. 5 through 8, inclusive, by way of illustration only. The particular mold illustrated is a four cavity mold that is intended for use with an extruder having twin extrusion nozzles disposed side-by-side. This mold comprises a lower frame plate 24 that has the lower mold half 25 secured to its upper face. The expressions "lower" and "upper" are used herein to refer to the position of the parts as they are shown in the drawings; it will be understood by those skilled in the art that in use of the mold, the parts may occupy different positions than those shown in the drawings.

The lower mold half 25 is a metallic block that is formed with four generally semi-spherical cavities 26. The block 25 is also formed with transverse recesses 27 in its face confronting the frame plate 24, and with upright passages 28, that are aligned with the axes of the four cavities respectively, and that communicate with the recesses 27. The channels 28 are reduced in diameter at their upper ends, to provide small diameter passages 30 that communicate with the cavities respectively. These interconnecting passageways in the block 25 permit the use of air for ejection of a completed article from the mold. The plate 25 is also formed with a plurality of intercommunicating passages 31, that are adapted to permit the circulation of cooling water through the mold.

The upper face of the plate 25 is formed with sharp-edge ridges 32 about the cavities 26 respectively, and with recessed areas 34 about these ridges.

Figure 8:
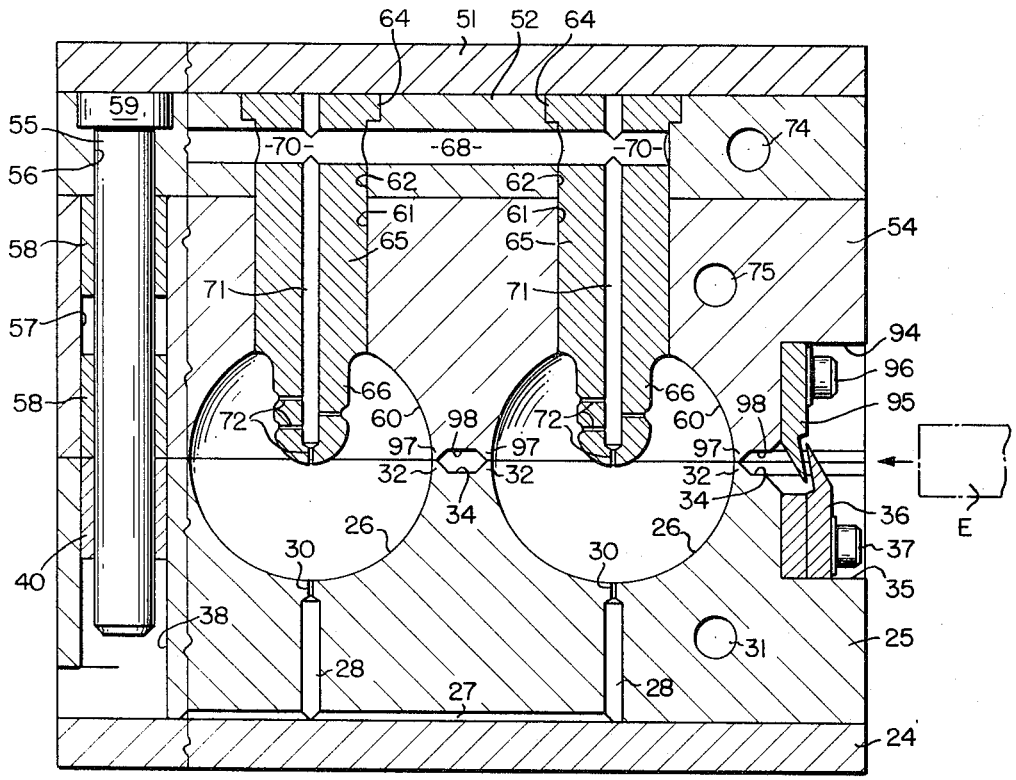
FIG. 8 is a section of the assembled mold halves such as would be seen if taken along the line 8—8 of FIG. 5, looking in the direction of the arrows.

Referring particularly to FIG. 8, the mold 25 is formed, at its face that confronts the extrusion E, with a recess that provides a shoulder 35 on which a knife blade 36 is disposed. The knife blade is secured to the block 25 by a plurality of threaded fasteners 37.

The block 25 is also formed, in each of its four corners, with generally upright bores 38, respectively. A sleeve 40 is secured in each of these bores. Each sleeve is formed with a bore of just sufficient diameter snugly to receive therein a guide pin from the other mold half upon assembly of the mold halves, as shown in FIG. 8, and as will be described presently.

Figure 7:
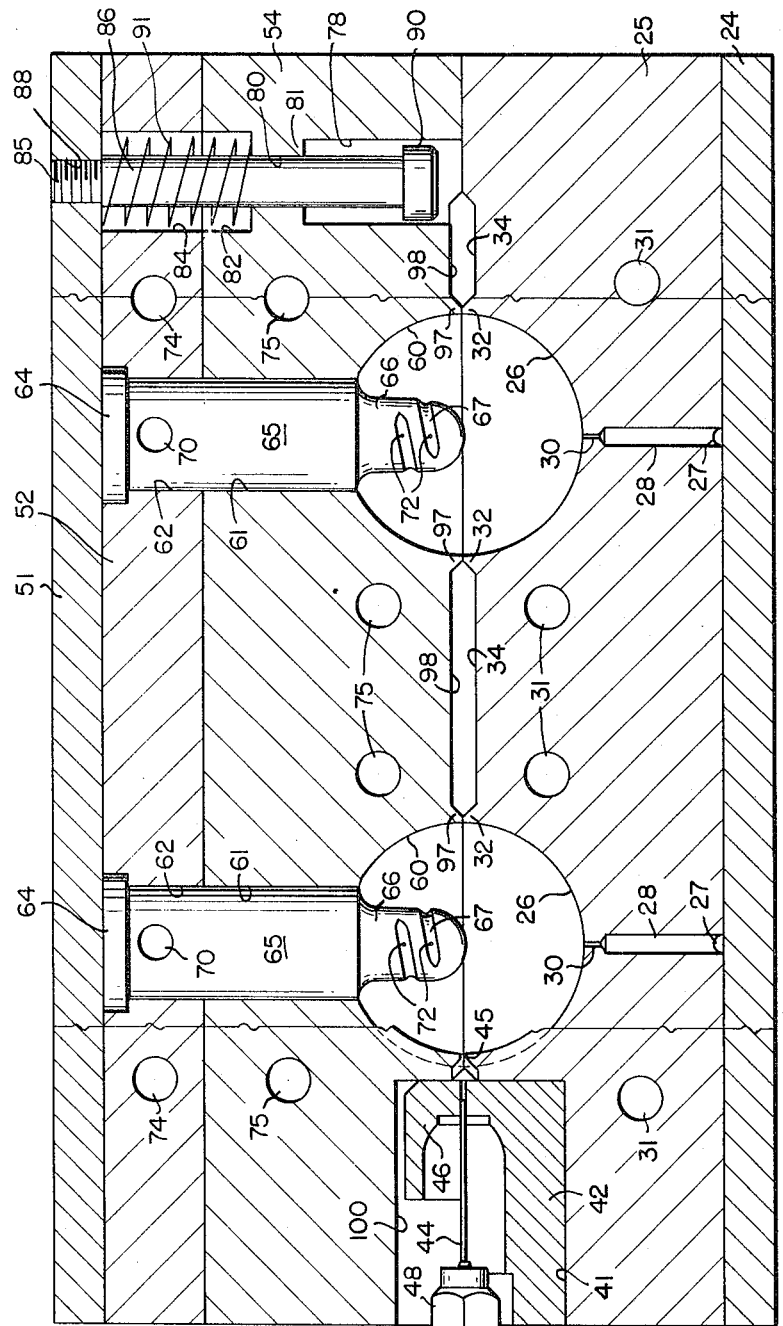
FIG. 7 is a section of the assembled mold halves such as would be seen along the line 7—7 of FIG. 6, looking in the direction of the arrows.

At its opposite sides, the mold block 25 is also formed with recesses that provide shoulders 41 (FIG. 7). The blocks 42, in which the pneumatic needles 44 are mounted, are engaged on these shoulders. The needles 44 are mounted for reciprocatory movement, to permit insertion into the respective cavities, and withdrawal therefrom, at the appropriate times. To this end, the block 25 is formed with passages that are generally indicated by the numeral 45, to permit the passage of the needle therethrough.

The needles 44 are mounted in pairs, at opposite sides of the mold assembly, and each of the needles is mounted to project at its front end through its own retainer block 46 and at its rear end is mounted to project from its own respective retaining nut 48. Each pair of retaining nuts 48 is mounted on a double acting air cylinder 50, whose piston (not shown) is coupled to the needles, to cause the needles to undergo their reciprocatory movement.

The upper half of the mold comprises three plates, an upper frame plate 51 and a retainer plate 52 that are secured together for movement as a unit, and a mold block or cavity block 54, that is coupled to the two plates for limited movement relative to the plates, as will be described presently.

Four leader pins 55 are disposed at the four corners of the upper frame plate 51, to depend downwardly therefrom through bores 56 in the retainer plate. These pins are formed with enlarged heads 59 that engage in enlarged diameter bores that communicate with the upper face of the retainer plate 52, to hold the pins in place. The cavity block 54 is formed with bores 57 that have larger diameters than the pins and through which the pins project. A plurality of sleeves 58 are secured in each of these bores 57, snugly and slideably to receive the leader pins to guide the mold halves in their movements toward and away from each other.

The cavity block 54 is also formed with four generally semi-spherical cavities 60 that are disposed to mate with the four cavities 26 in the lower mold block 25, upon assembly of the two mold halves. The cavity block 54 and the retainer plate 52 are formed with conjoint bores 61, 62, respectively, that communicate with the mold cavities respectively. The bores 62 are slightly enlarged at their upper ends, as shown in FIGS. 7 and 8. The enlarged ends 64 of four core pins 65 seat in these enlarged diameter bores respectively, to secure the pins in place on the lower surface of the frame plate 51, with the core pins 65 projecting downwardly through the bores 62, 61, respectively, and with their reduced diameter heads 66 projecting into the cavities. Each of the heads 66 is formed with a groove in its surface in the form of a female thread 67.

The retainer plate 52 is formed with a pair of air passages 68 (see FIGS. 6 and 8) that communicate with transverse bores 70 in the core pins 65 respectively. Each of the core pins is also formed with an upright, lengthwise bore 71, that communicates with its transverse bore 70. Each of the core pins 65 is also formed, at its lower end, with a plurality of reduced diameter openings 72 that extend through the end of the core pin, to provide communication between the lengthwise passage 71 and the cavity into which the core pin projects. The retainer plate 52 and cavity block 54 are also formed with passages 74, 75, respectively, through which cooling fluid can be circulated.

The cavity block 54 is also formed, adjacent its four corners, with a lower, generally upright bore 78 (FIG. 7) that communicates, through a reduced diameter bore 80 that provides a shoulder 81, with another upright, enlarged diameter bore 82 that is in registry with a similar bore 84 that is formed in the retainer plate 52, and that extends through the entire thickness of the retainer plate. The threaded end 85 of a stripper bolt 86 is secured in a threaded bore 88 in the frame plate 51, and the shank of the stripper bolt 86 projects through the bore 84 in the retainer plate, through the bore 82 in the cavity block, is slideably and snugly engaged in the reduced diameter bore 80, and projects down into the bore 78 in the lower part of the cavity block. Each of the stripper bolts is formed with an enlarged head 90 that has a diameter that permits it to move freely within the bore 78, but that will engage against the shoulder 81, to limit relative movement between the plates and the cavity block.

A die spring 91 (see FIG. 7) is mounted about the shank of each of the stripper bolts 86, within the conjoint bores 82 and 84 in the cavity block and retainer plate respectively. The four die springs act together constantly to urge the plates and the cavity block apart to a position in which the heads 90 of the four stripper bolts would engage against the shoulders 81 and in which the heads 66 of the core members are withdrawn from the cavities.

The cavity block 54 is also formed, at its front end (see FIGS. 8 and 6), with a recessed portion that provides a shoulder 94 against which a blade 95 is abutted and is secured to the cavity block by a plurality of threaded fasteners 96. The blade 95 is disposed to coact with and cooperate with the blade 36 on the lower half of the mold.

The cavity block is also formed with sharp-edged projecting ridges 97, that are disposed to cooperate with the similar ridges 32 on the lower mold block, and that are surrounded by recessed portions 98.

At its sides (see FIGS. 6 and 7), the mold block 54 is formed with recessed areas that provide shoulders 100, that are disposed over the needle assemblies.

In order to use molds made in accordance with this invention, the two mold halves are separated, and a pair of tubes E are extruded in the usual manner, on a continuous basis, to place a tube section between the confronting halves of the mold. The mold halves are then brought together, with tube sections disposed in each of the four cavities. The molds at this point are assembled, in the position shown in FIG. 7 and FIG. 8 relative to each other.

The needles are then moved so that each needle penetrates the tube section in its cavity. Air is injected, and the plastic material is forced outwardly to engage against the wall of the mold cavity.

As the plastic material is expanded, it engages against the head 66 of each core pin 65, and conforms to the shape of the head, including the thread-shaped groove 67. The air pressure that is employed to expand the plastic material depends upon such factors as the type and plasticity of the plastic material, the temperature at which the mold is maintained, and the like.

The mold temperature is controlled, preferably by the circulation of a cooling fluid such as water through the several passages provided for the purpose in the mold, to cause the plastic material to harden. At some predetermined time, such as, for example, after the plastic material has become sufficiently hardened to be self-sustaining in shape, the supply of air under pressure, through the injection needle, is cut off, and the air under pressure in the cap is permitted to bleed back out through the needle, thereby reducing the residual air pressure within the cap.

After the cap has rigidified sufficiently to be self-sustaining in shape, air under pressure is supplied through the channels 70, from which it flows through the channel 71 in each core pin, and out through the openings 72 in the head of each core pin. At the same time, relative movement is caused to occur between the upper frame plate 51 and the retainer plate 52, and the remainder of the mold assembly, to cause withdrawal of the core pins from the cavities. As this occurs, the pressure that is exerted by the die springs 91 maintains the upper and lower mold blocks in engagement with each other. The pressure of the air that is supplied to the core pins is adjusted to be approximately the same as the air pressure within the cap. This air from the core pin expands the part of the cap, that is engaged about the head of the core pin, sufficiently to permit the head of the core pin to be withdrawn from the cap. The escaping air acts as a cushion and lubricant. The pressure of the air, that is supplied to the core pins, must be carefully controlled, since a high pressure air blast might tend to collapse the cap or otherwise damage it.

As the withdrawal movement of the core pins is continued, the stripper bolts 86 are moved upwardly until their heads 90 engage against the shoulders 81. When this occurs, continued movement of the upper frame plate 51 and the retainer plate 52 will cause the mold halves to part from each other. When this occurs, the needles should either have been withdrawn or should be withdrawn at once. When the mold halves are sufficiently far apart, ejection air is permitted to flow through the passages 27 and 28, to pass through the reduced diameter passages 30 into the cavities, to eject the finished caps from the cavities. The cycle can then be repeated, to produce caps on a mass production basis.

A wide variety of plastic materials can be employed in the fabrication of articles in accordance with this invention. For example, both branched chain polyethylene and linear polyethylene can be used, as well as blends of these two materials, and, as well, rigid polyvinyl chloride, polypropyene, and several of the cellulosic materials. The process of this invention is particularly useful wherever an undercut structure is desired to be produced. The injection of air through core pins, during removal of the core pins, while using the cavity blocks to retain the article in position in the cavities as the core pins are withdrawn, is an important innovation and feature of this invention.

Figure 9:
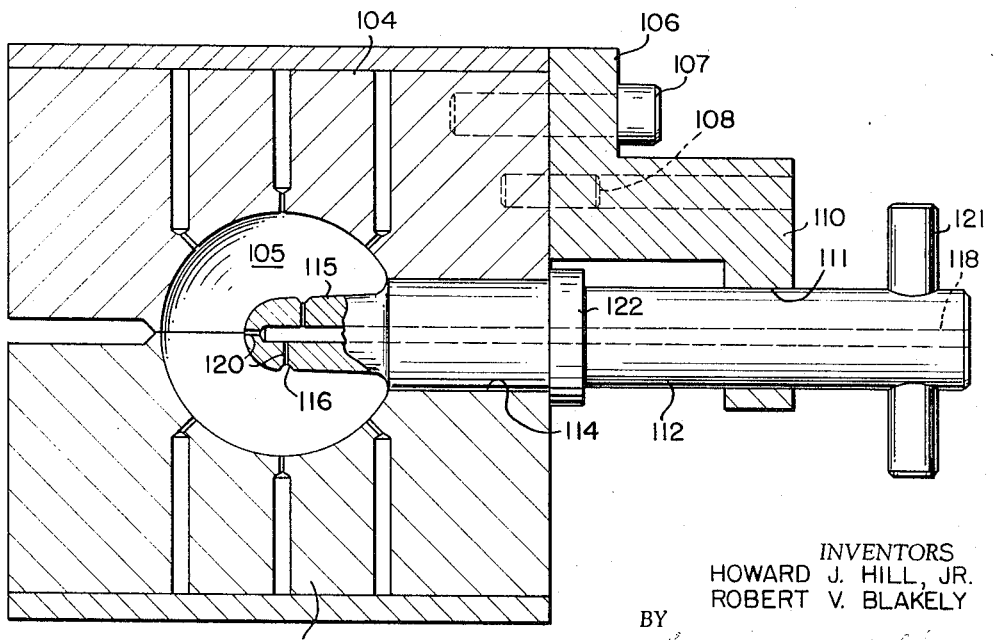
FIG. 9 is a section through a mold that is constructed in accordance with another, modified embodiment of this invention, for producing an article of the kind illustrated in FIGS. 3 and 4, for example, and that is intended for manual operation.

While the invention can be carried out with automatic machinery, for mass production of blow molded articles, the molding process can also be carried out, on a smaller scale, by hand. For example, referring now to FIG. 9, the mold assembly can comprise a pair of cavity blocks 102, 104, that have mating cavities that provide a generally spherical cavity 105. A bracket 106 is secured to the upper cavity block 104 by a plurality of fasteners 107 and 108. This bracket is provided with a downwardly depending arm 110, remote from the cavity blocks, that is formed with a generally circular opening 111. A core pin 112 is mounted for reciprocatory movement in a circular bore 114 that is provided between the assembled cavity blocks and in the opening 111 in the bracket arm 110. The core pin 112 is formed with a head 115 that projects into the cavity and that is formed with a thread groove 116. The core pin is formed with a passage 118 that extends lengthwise through the pin and with several openings 120 in its head, that provide communication between the passage 118 and the cavity. A dowel 121 is mounted at the outer end of the core pin, for grasping to permit manipulation of the core pin.

The operation of this one cavity, manually operated mold is generally similar to that of the four cavity, automatically operated mold previously described. After the plastic material has hardened sufficiently for the cap to be self-sustaining, air is supplied under pressure to the passage 118 through the core pin, and this air escapes through the openings 120 to dilate the internal socket of the cap slightly. As the air is injected into the cap socket, the core pin is withdrawn. The collar 122 on the core pin serves as a stop to limit the withdrawal of the core pin by engaging against the arm 111 of the core pin bracket, and when this limit is reached, the mold halves can be separated.

The thread that is formed in the socket may be either male or female. Similarly, the socket need not be formed with a thread as a means for mounting the cap or other article on a member that is inserted in the socket. Instead of a thread, either a groove or a ridge, or some other form of retainer means may be formed in the socket. The technique of dilating the socket, to permit easy withdrawal of core pin, is very versatile and permits the application of the process of this invention to the production of a wide variety of articles.

While the invention has been disclosed herein by reference to the details of preferred embodiments thereof, it is to be understood that such disclosure is intended in an illustrative, rather than in a limiting sense, and it is contemplated that various modifications in the construction and arrangement of the parts will readily occur to those skilled in the art, within the spirit of the invention and the scope of the appended claims.

We claim:

1. Blow molding apparatus for forming hollow articles of plastic material comprising a sectional mold block that is formed with a cavity, the sections of said mold block being movable relative to each other to permit the enclosure within said cavity of a hollow plastic body, a core member that is mounted to project into said cavity, means for blowing fluid under pressure into said hollow plastic body to form it into a shape that conforms with the configuration of the cavity and of the core member, and means for blowing air under pressure laterally from the sides of said core member for dilating the plastic around said core to facilitate the separation of the shaped article and the core member.

2. Blow molding apparatus for forming hollow articles of plastic material comprising a sectional mold block that is formed with a cavity, a core member that is mounted for movement relative to said mold block and that is disposed to have a portion thereof project into said cavity, the sections of said mold block being movable relative to each other to permit the enclosure within said cavity of a hollow plastic body, means for injecting fluid under pressure into said hollow plastic body to form it into a shape that conforms with the configuration of the cavity and of the portion of the core member that projects into said cavity, and means for blowing air under pressure laterally from the sides of said core member to dilate the part of the shaped article that is disposed over the core member, to facilitate the separation of the shaped article and core member.

3. Blow molding apparatus for forming hollow articles of plastic material comprising a pair of mating mold block halves that can be assembled to form a cavity therebetween, a core member that is mounted for movement relative to said mold halves and that is disposed with a portion thereof projecting into said cavity, the halves of said mold block being movable relative to each other to permit the enclosure within said cavity of a hollow plastic body, means for injecting fluid under pressure into said hollow plastic body to form it into a shape that conforms with the configuration of the cavity and of the core member, means for permitting the withdrawal of the core member from the cavity in a direction generally parallel to a plane that is defined by a parting line of the mold halves, and means for passing air under pressure laterally from the sides of said core member to dilate the part of the shaped article as disposed about the core member, to facilitate the separation of the shaped article and the core member.

4. Blow molding apparatus for forming hollow articles of plastic material comprising a pair of mating mold halves that can be assembled to enclose a cavity therebetween, a core member that is mounted for movement relative to said mold halves and that is disposed with a portion thereof projecting into said cavity, said mold halves being movable relative to each other to permit the enclosure within said cavity of a hollow plastic body, means for injecting fluid under pressure into said hollow plastic body to form it into a shape that conforms with the configuration of the cavity and of the core member, means for permitting the withdrawal of the core member from the cavity in a direction that is generally normal to a plane that is defined by a parting line of the mold halves, and means for passing air under pressure laterally from the sides of said core member to dilate the part of the shaped article that is disposed about the core member, to facilitate the separation of the shaped article and the core member.

5. Blow molding apparatus for forming hollow articles of plastic material comprising a sectional mold block that is formed with a cavity, the sections of said mold block being movable relative to each other to permit the enclosure within said cavity of a hollow plastic body, a core member that is mounted to project into said cavity and that is formed and disposed to form a socket in the molded article, and that has an irregular surface, to form an irregular surface in said socket, to resist removal of the core member from the socket, means for injecting fluid under pressure into said hollow plastic body to form it into a shape that conforms with the configuration of the cavity and of the core member therein, and means for passing air under pressure laterally from the sides of said core member for dilating said socket to facilitate the separation of the shaped article and the core member and the removal of the core member from the socket.

6. Apparatus in accordance with claim 5 wherein the irregular surface of the core member is arranged to form a screw thread within the socket of the shaped article.

7. In a blow molding apparatus for forming hollow articles of plastic material in a mold cavity, a core member that is movable relative to said cavity and that can be positioned, during molding, with a portion thereof projecting into the cavity to form a socket in the molded article, means for passing air under pressure laterally from the sides of said core member to dilate the socket, and means for permitting withdrawal of the core member from the mold cavity while the socket of the shaped article is dilated.

8. In a blow molding apparatus for forming hollow articles of plastic material, a sectional mold block that is formed with a cavity, a core member that is movable relative to said cavity and that can be positioned, during molding, with a portion thereof projecting into the cavity, to form a socket in the molded article, means for passing air under pressure laterally from the sides of said core member to dilate the socket to facilitate the removal of the core member from the socket, means for permitting withdrawal of the core member from the mold cavity and the socket, and means for holding the mold sections containing the cavity in engagement until the core member has been withdrawn from the socket.

9. Blow molding apparatus for forming hollow articles of plastic material comprising a sectional mold block that is formed with a cavity, the sections of said mold block being movable relative to each other to permit the enclosure within said cavity of a hollow plastic body, a core member that is mounted for reciprocatory movement relative to said mold block and that can be positioned, during molding, with a portion thereof projecting into the cavity to form a socket in the molded article, means for injecting fluid under pressure into said hollow plastic body to form it into a shape that conforms with the configuration of the cavity and of the portion of the core member therein, means for withdrawing the core member from the cavity while the mold block sections containing the cavity are engaged, means for passing air under pressure laterally from the sides of said core member to dilate the socket, to facilitate the withdrawal of the core member from the socket, and means operative after withdrawal of the core member from the socket to separate the mold sections and to eject the shaped article from the cavity.

10. Apparatus in accordance with claim 9 wherein said core member is formed with an irregular surface to the configuration of which the socket of the shaped article conforms, to make withdrawal of the core member from the socket difficult in the undilated form of the socket.

11. Apparatus in accordance with claim 10 wherein the surface irregularity on the core member portion that projects into the cavity is arranged to form a screw thread in the socket of the shaped article.

12. Blow molding apparatus for forming hollow articles of a thermoplastic material comprising a sectional mold block that is formed with a cavity, the sections of said mold block being movable relative to each other to permit the enclosure within said cavity of a hollow thermoplastic body in its plastic state, an elongate core member that is mounted for reciprocatory movement relative to said mold block and that can be positioned, during molding, with a portion thereof projecting into the cavity, to form a socket in the molded article, means for injecting fluid under pressure into said hollow plastic body to form it into a shape that conforms with the configuration of the cavity and of the portion of the core member that is projecting into said cavity, means for cooling the mold to harden the thermoplastic material to make it self-sustaining in shape, means for withdrawing the core member from the cavity while the mold block section containing the cavity are engaged, means for passing air axially and transversely through the core member into the socket after the plastic has become self-sustaining, to dilate the socket to facilitate the withdrawal of the core member from the socket, lost motion means coupled with said means for withdrawing the core member and operative after withdrawal of the core member from the cavity to separate the mold sections, and means to eject the shaped article from the cavity.

13. In a blow molding apparatus for forming hollow articles of plastic material, a pair of mating mold halves that can be assembled to enclose a cavity therebetween, a blade means mounted on the mold halves respectively for severing a length of a hollow plastic body for enclosure within the cavity, a core member that is movable relative to said cavity and that can be positioned, during molding, with a portion thereof projecting into the cavity to form a socket in the molded article, means for passing air under pressure laterally from the sides of said core member to dilate the socket to facilitate the separation of the core member from the socket, and means for permitting withdrawal of the core member from the socket and from the cavity.

14. Blow molding apparatus for forming shaped hollow articles from thermoplastic materials in its plastic state, comprising a pair of mating mold halves that can be assembled to enclose a cavity therebetween, blade means mounted on the mold halves respectively for severing a length of a hollow body of a thermoplastic material that is in its plastic state for enclosure within the cavity, a core member that is mounted for reciprocatory movement relative to the assembled mold halves and that can be positioned, during molding, with a portion thereof projecting into the cavity to form a socket in the molded article, means for injecting fluid under pressure into said hollow plastic body to form it into a shape that conforms with the configuration of the cavity and of the portion of the core member that projects into the cavity, means for cooling the mold assembly to harden the thermoplastic material sufficiently to be self-sustaining, means for withdrawing the core member from the cavity while the mold halves are engaged, means for passing air under pressure laterally from the sides of said core member to dilate the socket to facilitate the withdrawal of the core member from the socket, lost motion means coupled to said means for withdrawing the core member and operative after withdrawal of the core member to separate the mold halves, and means to eject the shaped article from the cavity.

15. Apparatus in accordance with claim 14 wherein said core member is formed, on the portion thereof that projects into the cavity, with an irregular surface that is adapted to produce an irregular surface in the socket that is formed about the core member, to make separation of the core member and the socket difficult in the undilated state of the socket.

16. Blow molding apparatus for forming hollow articles from thermoplastic material in its plastic state comprising a pair of mating mold halves that can be assembled to enclose a cavity therebetween with a hollow body of thermoplastic material in its plastic state disposed in said cavity, at least one of said mold halves being disposed with an opening therein that is in communication with the cavity, an elongate core member that is mounted for reciprocatory movement in said opening and that can be disposed, during molding, with a portion thereof projecting into the cavity and effectively closing the opening and the cavity, to form a socket in the molded article, the portion of said core member that projects into the cavity being formed with an irregular surface, means for injecting fluid under pressure into said hollow plastic body to form it into a shape that conforms with the configuration of the cavity and with the portion of the core member that projects into the cavity, thereby to form said socket with an irregular internal surface, means to permit withdrawal of the core member from the cavity by movement in said opening while said mold halves containing the cavity remain engaged, means for passing air axially and transversely of said core member into the socket to dilate the socket to facilitate the withdrawal of the core member from the socket, and lost motion means coupled to the core member and operative after withdrawal of the core member to separate the mold halves to permit recovery of the shaped article from the cavity.

17. An apparatus for making an article of manufacture having a cavity enclosed by a unitary wall with a socket defined by a socket wall integral with said unitary wall and projecting into said cavity, said socket wall being undercut to permit attachment of said article to a member insertable in said socket, said apparatus comprising:
(a) separable mold section means forming a mold cavity having a configuration corresponding to said article, said mold section means comprising a socket forming mold section having a configuration corresponding to said socket and projecting into said cavity, but being withdrawable from said cavity, said socket forming mold section having at least one fluid passage and outlet for introducing laterally of said socket forming mold section fluid under pressure for dilating the socket of an article formed in said cavity to facilitate withdrawal of said socket forming mold section from said socket; and
(b) means for expanding a plastic body in its plastic state in said mold cavity to conform said plastic body to the configurations of said cavity and socket forming mold section.

18. An apparatus according to claim 17, wherein said mold section means comprise passages for conveying heat exchange fluid therethrough.

19. A method of molding a shaped plastic article having a socket with an irregular, lateral surface, said method comprising:
(a) forming a mold cavity between confronting faces of a plurality of mold sections including at least one mold section that projects into said cavity to form said socket;
(b) expanding a plastic body that is in its plastic state in said mold cavity to conform said plastic body to the configuration of said cavity and said socket forming mold section;
(c) converting said plastic from its plastic state to a state in which said plastic is self-sustaining in shape;
(d) dilating said socket by injecting fluid under pressure laterally from said socket forming mold section;
(e) withdrawing said socket forming mold section axially from said dilated socket.

20. A method of molding a shaped plastic article having a socket with an irregular, lateral surface, said method comprising:
(a) forming a mold cavity between confronting faces of a plurality of mold sections including at least one mold section that projects into said cavity to form said socket and that has an irregular, lateral surface to which a lateral surface of said socket will conform;
(b) expanding a plastic body that is in its plastic state within said mold cavity to conform said plastic body to the configuration of said cavity and said socket forming mold section;
(c) cooling said plastic sufficiently so that said plastic body is self-sustaining in shape;
(d) dilating said socket by injecting fluid under pressure laterally from said projecting mold section; and
(e) withdrawing said socket forming mold section axially from said dilated socket.

21. A method of molding a shaped hollow plastic article having a walled socket, the wall of which is configured so that a rigid object substantially filling said socket cannot be withdrawn from said socket in one motion axially of said socket without displacement of said wall, said method comprising:
(a) forming a mold cavity between confronting faces of a plurality of mold sections including at least one mold section that projects into said cavity to form said socket;
(b) expanding a hollow plastic body that is in its plastic state in said mold cavity by applying fluid under pressure internally to said plastic body to conform said plastic body to the configuration of said cavity and said socket forming mold section;
(c) cooling said plastic body sufficiently so that said plastic body is self-sustaining in shape;
(d) dilating said socket by injecting laterally from said socket forming mold section fluid under pressure sufficient to force said wall of said socket away from said socket forming mold section; and
(e) withdrawing said socket forming mold section axially from said dilated socket.

22. The method of claim 21 wherein the pressure of said fluid dilating said socket is of the same order of magnitude as the pressure of said fluid expanding said plastic body.

23. A method of molding a shaped hollow plastic article having a socket with an irregular, lateral surface, said method comprising:
(a) forming a mold cavity between confronting faces of a plurality of mold sections including at least one mold section that projects into said cavity to form said socket;
(b) expanding a hollow plastic body that is in its plastic state in said mold cavity by applying fluid under pressure internally to said plastic body to conform said plastic body to the configuration of said cavity and said socket forming mold section;
(c) cooling said plastic body sufficiently so that said plastic body is self-sustaining in shape;
(d) dilating said socket by injecting fluid under pressure laterally from said socket forming mold section;
(e) withdrawing said socket forming mold section while holding said plastic body in place relative to the other of said mold sections; and
(f) then recovering said shaped article from said mold cavity.

24. A method of molding a shaped hollow plastic article having a walled socket, the wall of which is configured so that a rigid body substantially filling said socket cannot be withdrawn axially from said socket in a single motion without displacing said wall, said method comprising:
(a) forming a mold cavity between confronting faces of a plurality of mold sections including at least one mold section that projects into said cavity to form said walled socket;
(b) expanding a hollow plastic body that is in its plastic state in said mold cavity by applying fluid under pressure internally to said plastic body to conform said plastic body to the configuration of said cavity and said socket forming mold section;
(c) cooling said plastic body sufficiently so that said plastic body is self-sustaining in shape;
(d) injecting fluid laterally from said socket forming mold section under pressure sufficient to force said wall of said socket laterally away from said socket forming mold section; and
(e) at the same time withdrawing said socket forming mold section axially from said socket.

25. The method of claim 24 wherein said fluid injected between said wall of said socket and said socket forming mold section is under a pressure of the order of magnitude of the pressure of said fluid applied internally of said plastic body.

26. The method of claim 24 wherein said plastic body is held in position in said mold cavity as said socket forming mold section is withdrawn from said socket.

27. A method of molding a shaped hollow plastic article having a walled socket, the wall of which is configured so that a rigid body substantially filling said socket cannot be withdrawn from said socket axially in a single motion without displacing said wall, said method comprising:
(a) forming a mold cavity of a pair of mating mold halves that can be assembled to provide said mold cavity therebetween;
(b) disposing a core member within said mold cavity, said core member having a lateral surface to which said wall of said socket will conform;
(c) expanding a hollow plastic body within said mold cavity by fluid pressure applied internally of said plastic body to conform said body to said mold cavity and said core member;
(d) cooling said plastic body sufficiently so that said plastic body is self-sustaining in shape;
(e) dilating said socket by injecting laterally from said core member fluid under pressure sufficient to force said wall of said socket laterally away from said core; and
(f) withdrawing said core member in a single axial motion from said dilated socket.

28. The method of claim 27 including recovery of said plastic body from said mold cavity after withdrawal of said core member.

29. The method of claim 27 wherein the pressure of said fluid dilating said socket is of the order of magnitude of the pressure of said fluid expanding said plastic body.

30. A process for making a shaped article having a socket with a first lateral surface undercut relative to a second lateral surface between said first lateral surface and the open end of said socket, comprising:
(a) introducing a hollow body of plastic material in a plastic state into a mold cavity having the configuration of said article and comprising an inwardly projecting core member corresponding to said socket;
(b) expanding said body within said cavity by injecting fluid under pressure into the hollow interior of said body to conform said body to said mold cavity and said core member, whereby a socket in said body is formed about said core member;
(c) cooling said expanded plastic body until it is self-sustaining in shape;
(d) dilating said socket at said first lateral surface by applying to said first lateral surface from said core member fluid under pressure sufficient to force said first lateral surface outwardly from said core member;
(e) withdrawing said core member from said socket while it is so dilated; and
(f) removing the resulting article from said mold.

31. A process according to claim 30 wherein said first lateral surface is in the form of a female thread.

(References on following page)

References Cited by the Examiner

UNITED STATES PATENTS

| | | | |
|---|---|---|---|
| 1,795,280 | 3/1931 | Parks | 16—121 |
| 1,916,692 | 6/1933 | Scribner | 264—318 |
| 2,182,007 | 12/1939 | Tegarty | 16—121 |
| 2,349,177 | 5/1944 | Kopitke | 264—98 X |
| 2,962,758 | 12/1960 | Politis | 264—94 |
| 3,015,856 | 1/1962 | Cohn | 264—94 |
| 3,089,186 | 5/1963 | Park | 18—5 |
| 3,091,803 | 6/1963 | Scott et al. | 18—5 |
| 3,183,292 | 5/1965 | Dvoracek | 264—335 |

ROBERT F. WHITE, *Primary Examiner.*

DONLEY J. STOCKING, *Examiner.*

A. R. NOE, *Assistant Examiner.*